United States Patent [19]
Barnsley et al.

[11] Patent Number: 5,867,603
[45] Date of Patent: Feb. 2, 1999

[54] METHOD FOR TRANSMITTING FRACTAL TRANSFORM DATA TO SUPPORT DIFFERENT COMPRESSOR/ DECOMPRESSOR DESIGNS

[75] Inventors: Michael F. Barnsley, Duluth; Ning Lu, Norcross; David R. Howard, Atlanta, all of Ga.

[73] Assignee: Iterated Systems, Inc., Atlanta, Ga.

[21] Appl. No.: 499,941

[22] Filed: Jul. 10, 1995

[51] Int. Cl.$^6$ .............................. G06K 9/36; G06K 9/46
[52] U.S. Cl. ............................................ 382/249; 382/248
[58] Field of Search .................................... 382/166, 168, 382/170, 232, 233, 235, 243, 244, 249, 278; 358/530, 539, 432, 433, 427; 348/397, 398, 399

[56] References Cited

U.S. PATENT DOCUMENTS

| | | | |
|---|---|---|---|
| 4,941,193 | 7/1990 | Barnsley et al. | 382/56 |
| 5,065,447 | 11/1991 | Barnsley et al. | 382/56 |
| 5,347,600 | 9/1994 | Barnsley et al. | 382/56 |
| 5,384,867 | 1/1995 | Barnsley et al. | 382/56 |
| 5,497,435 | 3/1996 | Berger | 382/249 |
| 5,701,369 | 12/1997 | Moon et al. | 382/249 |
| 5,732,158 | 3/1998 | Jaenisch | 382/249 |

OTHER PUBLICATIONS

"Self–simplicity of the Multi resolution Image 1 Video Decomposition", Kiselyov; IEEE 1994; pgs 331–340.

"Fractal Block Coding of Digital Video"; Lazar; IEEE 1994, pp. 297–308.

*Primary Examiner*—David K. Moore
*Assistant Examiner*—Jerome Grant, II
*Attorney, Agent, or Firm*—Morris, Manning & Martin, L.L.P.

[57] ABSTRACT

A method for transmitting fractal transform parameters generated by a variety of compressors using different fractal transform parameters is disclosed. The method includes generating an universal header having image reference data, color space data, fractal transform region reference data, and file decoding data and generating a fractal transform data segment having fractal transform parameters for domains and ranges used by a compressor to generate fractal transform parameters. The image reference data includes image dimensions expressed in physical size units so that the regeneration of the image at a decompressor is resolution independent. The color space parameters include identification of the original image color space and may include identification of a color space into which the original image is converted. The fractal transform region reference data includes dimensional information regarding panels, domains, and ranges used by the compressor and such data is expressed in physical size units to further support the resolution independence of the image regeneration. The method preferably includes the step of generating an optional header which identifies frequently used spatial matrix coefficients, scaling factors, and gradient matrix coefficients. The fractal transform parameters associated with each of the domains in the fractal transform data segment include indices which correlate a domain to spatial matrix coefficients, a scaling factor, or gradient matrix coefficients in the optional header. In this way, the transmission method efficiently provides frequently used spatial matrices, scaling factors, and gradient matrices to a decompressor so the decompressor can correlate these frequently used forms to domains during regeneration.

11 Claims, 11 Drawing Sheets

| FIF HEADER | UNIVERSAL HEADER | |
| --- | --- | --- |
| | OPTION HEADER | |
| FIF DATA | PANEL DATA - 0 | SCREEN DATA - 0 |
| | | SCREEN DATA - 1 |
| | | ⋮ |
| | | SCREEN DATA - k |
| | PANEL DATA - 1 | |
| | ⋮ | |
| | PANEL DATA - n | |

ADJUSTED NUMBERS

| LEVEL INDEX | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| LEVEL | 1 | 2 | 3 | 4 | 5 | 6 | 7 | 8 | 12 | 16 | 24 | 32 | 48 | 64 | 128 |

FIG 5

UNIVERSAL HEADER

| | | | |
|---|---|---|---|
| DWORD | at 0 | fif_id | (= 00464946 h = 'F' 'I' 'F' '\0') FIF file identifier |
| CHAR | at 4 | unit | physical size unit, formed by a letter |
| | | METER | ( = 'm' = 6D h ) for *meter*, and |
| | | INCH | ( = '"' = 22 h ) for *inch*, and |
| | | UNKNOWN | ( = 'u' = 76 h ) for *unspecified* |
| CHAR | at 5 | power | power of 10 of the unit between -128 and 127 |
| DWORD | at 6 | width | image physical width |
| DWORD | at 10 | height | image physical height |
| WORD | at 14 | header_size | FIF total header size |
| DWORD | at 16 | file_size | FIF total file size |
| CHAR | at 20 | screen [4] | compressed image screens in 4 characters. The number of screen, denoted by num_screen, will be the number of non-zero characters. *e.g.* |
| | | GRAYSCALE | ( = { 'Y', 0, 0, 0 } ) grayscale, |
| | | COLOR_YUV | ( = { 'Y', 'U', 'V', 0} ) classic YUV color, |
| | | COLOR_EUV | ( = { 'E', 'U', 'V', 0} ) equalized YUV color, |
| | | COLOR_GRB | ( = { 'G', 'R', 'B', 0} ) GRB color, |
| | | COLOR_KCMY | ( = { 'K', 'C', 'M', 'Y' } KCMY color |

*FIG 6A*

| Type | Offset | Name | Description |
|---|---|---|---|
| CHAR | at 24 | channel[4] | image display channels in 4 characters. The number of channels, denoted by num_channel, will be the number of non-zero characters. e.g.<br>GRAYSCALE ( = { 'Y' , 0 , 0 , 0 } ) grayscale,<br>COLOR_RGB ( = { 'R' , 'G' , 'B' , 0 } ) RGB color,<br>COLOR_BGR ( = { 'B' , 'G' , 'R' , 0 } ) BGR color,<br>COLOR_GRB ( = { 'G' , 'R' , 'B' , 0 } ) GRB color,<br>COLOR_KCMY ( = { 'K' , 'C' , 'M' , 'Y' } ) KCMY color |
| WORD | at 28 | tile | physical size of the screen domain base tile |
| WORD<br>WORD | at 30<br>at 32 | row<br>column | number of tiles in a row on the image screen<br>number of tiles in a column on the image screen |
| WORD | at 34 | step 1 | physical size of the primary screen range address unit |
| WORD | at 36 | step 2 | physical size of the secondary screen range address unit |
| WORD | at 38 | level 1 | level marker of active domain tile sizes for the primary screens |
| WORD | at 40 | level 2 | level marker of active domain tile sizes for secondary screens. |

*FIG 6B*

| | | | |
|---|---|---|---|
| WORD | at 42 | pw_in_title | maximal number of tiles in a row in a panel. It will be the default number of tiles in a row in all on screen panels except the last column of panels if no specified panel box information is further given in the header. |
| WORD | at 44 | ph_in_tile | maximal number of tiles in a column in a panel. It will be the default number of tiles in a column in all on screen panels except the last column of panels if no specified panel box information is further given in the header |
| DWORD | at 46 | max_data | maximal data size for a panel |
| BYTE | at 50 | pack<br>UNPACKED<br>DEFAULT<br>CUSTOMIZED | packing version<br>( = 00 h ) unpacked format,<br>( = 01, ..., 08 h ) default Huffman packer,<br>( = C1, ..., CF h ) customized packer |
| BYTE | at 51 | option | optional header tag, it is the number of tags in the optional header |
| WORD | at 52 | image_id | an id number may be assigned to the given image |
| WORD | at 54 | filter<br>AVERAGE<br>SUBSAMPLE<br>CUSTOMIZED | recommended decompression filter<br>( = 0000 h ) averaging closest 4 samples,<br>( = 0001 h ) subsampling nearest sample,<br>( = 00C0 h ) use customized filter. |

OPTIONAL HEADER

*Paneling Information*

```
BYTE   label                  = PANEL_INFO_TAG ( = 04 h )
WORD   length                 panel information length ( = num_panel*12 + 2)
WORD   num_panel              panel number
PANEL  panel [num_panel]      panel information
```

Where PANEL is a 12 bytes structure having the following entries:

```
WORD   x       panel x-origin in physical unit
WORD   y       panel y-origin in physical unit
WORD   w       panel width in physical unit
WORD   h       panel height in physical unit
LONG   data    panel data offset from the beginning of the file
```

For multi-panel image *Paneling Information* must be tagged. In the case of one panel, the default panel data offset is assumed to be the value of header_size.

*FIG 8A*

*Indexed S-Forms*

```
BYTE    label                = S_MATRIX_TAG ( = 11 h )
WORD    length               s-matrix data length ( = (num_s-16)*8 + 1 )
BYTE    num_s                number of spatial matrices
SHORT   s[num_s-16] [4]      s-matrix coefficients in 1/256's
```

*Indexed P-Values*

```
BYTE    label                = P_VALUE_TAG ( = 12 h )
WORD    length               p-value data length ( = num_p – 4 )
BYTE    num_p                number of p-values
CHAR    p[num_p-5]           p-values in 1/32 for range of (-2,2)
```

*Indexed T-Froms*

```
BYTE    label                = T_MATRIX_TAG ( = 13 h )
WORD    length               t-matrix data length ( = (num_t-17)*4+1 )
BYTE    num_t                number of tilt matrices
SHORT   t[num_t-17] [2]      t-matrix coeffecients in 1/256's
```

FIG 8B

Color Converting Matrix

| | | | | | | |
|---|---|---|---|---|---|---|
| BYTE | label | | | | | = S2C_MATRIX_TAG ( = 30 h ) |
| WORD | length | | | | | data length = |
| | | | | | | ( = num_channel * (num_screen +1) *2 + 2) |
| SHORT | factor | | | | | the common divisor of the formulas, |
| SHORT | screen2channel [num_channel] [num_screen + 1 ] | | | | | coefficients of the screen to channel converting formula. |

```
00 20 96 F3 F6 E5 ED E8                e.g. for the classical YUV scheme:
00 20 00 00 33 33 67 E6                  denominator = 8192
00 20 00 40 00 00 00 20                G = (8192Y -  3178U -  6668V+4923*256) / 8192
00 20                                  R = (8192Y +            13107V -        6553*256) / 8192
                                       B = (8192Y + 16384U -                   8192*256) / 8192

03 00 02 00 00 02 FD FF                for the equalized EUV scheme:
03 00 00 FB FF 00 01 00                  denominator = 3
03 00 00 00 00 FF 01 00                G = (3E + 2U + 2V - 2*256) / 3
03 00 02 00 F8 FF 00 00                R = (3E - 4U + 2V + 1*256) / 3
                                       B = (3E + 2U - 4V + 1*256) / 3
```

User Information Header

| | | |
|---|---|---|
| BYTE | label | = USER_DATA_TAG ( = F0 h, ..., FF h ) |
| WORD | length | user data length |
| BYTE | user [length] | user data |

The total headersize will be padded to the boundary of a WORD by adding zeros.

FIG 8C

An unpacked fractal code consists of 28 bytes:

| | | | |
|---|---|---|---|
| WORD | at 0 | dx | x-coordinate of upper left vertex of d, in image physical size |
| WORD | at 2 | dy | y-coordinate of upper left vertex of d, in image physical size |
| WORD | at 4 | rx | x-coordinate of image of d upper left, in range address step |
| WORD | at 6 | ry | y-coordinate of image of d upper left, in range address step |
| BYTE | at 8 | index | code index is formed in 8 bits: dddd1111 Where dddd is the domain screen index, and 1111 is the level index |
| BYTE | at 9 | s_id | index of the s-form |
| BYTE | at 10 | p_id | index of the p-value |
| BYTE | at 11 | t_id | index of the t-form |
| SHORT | at 12 | q | intensity translation q-value, in 1/16384's of MAX_COLOR (active when s_id is 255 and s_id is unsigned) |
| SHORT | at 14 | s[4] | s-form matrix (active when p_id is 255 and s_id is unsigned) |
| SHORT | at 22 | p | intensity scaling parameter (active when t_id is 255 and p_id is unsigned) |
| SHORT | at 24 | t[2] | gradient or "tilt" matrix (active when t_id is 255 and t_id is unsigned) |

METHOD FOR TRANSMITTING FRACTAL TRANSFORM DATA TO SUPPORT DIFFERENT COMPRESSOR/ DECOMPRESSOR DESIGNS

FIELD OF THE INVENTION

This invention relates to the transmission of data compression parameters, and more particularly, to the transmission of fractal transform data compression parameters.

BACKGROUND OF THE INVENTION

Methods for compressing data to increase the amount of data which may be transmitted through the existing bandwidth of a conduit are well known. Such methods are used by a compressor or encoder to determine functions which represent data being input to a system. The functions require less information to describe than the data being represented so less data is transmitted. Thus, the transmission of the elements describing the function which represents the original data set may be done more quickly or with less processing than the original data set itself. Once the functions have been transmitted, a decompressor or decoder at the receiving site may use the function to regenerate the original data set at the receiving site.

One well known data compression method is the fractal transform method. This method is the subject of a number of patents including U.S. Pat. Nos. 5,065,447 and 5,384,867 to Barnsley, et al. The fractal transform technique is based upon the theory that data, especially image data, is comprised of redundant information. As a result, many portions of the data contained within a data set may be expressed in terms of other data within the set. By identifying those portions which are common to many subsets of the data in the original set and determining the functions which map the subsets to the redundant data, an encoder may then use the subset identifiers and mapping functions to describe the original data set. These subset identifiers and mapping functions may be transmitted to a decoder which implements a deterministic or random iterative method to regenerate the original data set. In the fractal transform method, the data subsets are typically called domains, while the redundant information is derived from ranges. The steps of dividing a data set into domains and ranges so the mapping functions which best describe the original data set may be determined are set forth in the patents identified above and are hereby expressly incorporated herein by reference.

The use of fractal transform techniques to compress data has proliferated, especially in the image field. This proliferation has led to a number of variations in compressor and decompressor designs. For example, some fractal transform systems use affine map transformations to represent data sets while other systems may use polynomial functions or the like. Even within systems which use affine map transformations, each system may vary in the coefficient matrices which are used to evaluate the correspondence of a domain to a range. In fact, compressors may vary many different parameters to compress data such as the sizes and shapes of the ranges and domains used and the methods for shrinking the ranges to form orientation blocks. As a result, the identifiers of the domains and ranges and the mapping functions generated to represent data sets may vary widely from one compressor to another.

Known methods for transmitting domain and range identifiers with mapping functions are tailored to correspond to compression and decompression methods implemented for particular applications. That is, the transmission methods are adapted to the particular parameters implemented in a compressor. These transmission methods are not readily adaptable to other applications or compressor/decompressor designs. Since the transmission methods are limited in the data delivered to a decompressor, the decompressor design is usually limited to performing the inverse process of a compressor for a particular application. While this limited decompressor design and tailoring of the data transmission method may reduce the processing and time needed for transmission and decompression of the fractal transform data, it may not support variations of fractal transform parameters used for different applications or communication with decompressors other than those designed for a particular application. What is needed is a data transmission method that supports variations of fractal transform parameters so a variety of decompressors may use the data to decompress images.

Most compressors are designed to use a group of coefficient matrices which are computationally efficient and which generally provide good correspondence between domains and ranges. As a result, some shorthand notation scheme may be used by a transmission method to identify these matrices. However, some original data sets contain domains which are difficult to match to a range. For example, in an area of an image where there is a great degree of detail, matrices having computationally complex coefficients may be required to map the domain to a range. Identification of such a matrix in current transmission methods is done in a way which requires either special processing to detect and decode the matrix at the decompressor or the inclusion of the coefficient matrix for each domain despite the frequent use of one or more matrices. What is needed is a fractal transform data transmission method which provides coefficient matrices used for only one domain without sacrificing the ability to use a shorthand scheme to identify more frequently used matrices.

One of the advantages of fractal transform methods is its independent image resolution property. This property is apparent in the magnification of an image or in displaying an image on a device having a display space with a different size and resolution than the image input device. In pixel oriented schemes, the magnification level may get to a level where the information in a pixel is reproduced many times to cover an expanded area in a magnified view. Such reproduction generates "block" structure rather than detail. Likewise, pixel oriented systems do not convert image information well from one screen of a first height and width to a screen having a second height and width. Both of these limitations arise because such systems must determine how to move the pixels and perhaps generate other pixels to conform the informational content generated by the input device or the area to be magnified to the display elements of the output device or magnification space. Fractal imaging techniques generate mapping functions for one area of an image to another so the location of the domains and ranges defining those areas may be described with a continuous measurement unit such as an inch rather than a discrete unit such as a pixel. As a result, the domains and ranges may be shifted, expanded and contracted more easily than pixel oriented systems where the number and height/width ratio of the pixels may not be compatible with a second pixel system. In fractal transform systems, the mapping functions are able to generate the informational content for the modified areas. As a result, fractal transformed image data may be used to provide magnification detail as some portion of an image is expanded or to provide an image on an output device with a different pixel resolution and size than the input device. Current transmission schemes for fractal transform data are specifically drawn to an application and usually correspond to the input/output limitations expected for the applications. Consequently, they typically define the pixel locations for domains and ranges with reference to the device characteristics for the application. As a result, decompressors are limited by the resolution parameters of the input/output devices. What is needed is a method of data transmission that provides image information in a resolution independent manner.

Fractal images are generated by a variety of devices which represent data very differently. For example, image data may be generated by facsimile transmission machines which typically generate data using grayscale information or an image scanner which may generate colorized images in any of a number of color space systems. In some compressors, the color space of an input image may be converted to another color space before it is compressed. For example, a compressor may convert an image from a red-green-blue (RGB) color space to a luminance/chrominance (YUV) color space to take advantage of some computational advantages of that color space. To properly decompress the data to regenerate the image, the decompressor needs to be able to identify the color components comprising the image as compressed and convert them to the original color space for display. As discussed above, compressor/decompressor combinations are typically developed for a particular application so the compressor/decompressor and the data transmission between them only support the color system or systems used in the application. What is needed is a fractal transform data transmission method which identifies the parameters for converting between any of a number of known color systems regardless of application.

Another problem arises because some compressors distort the color space during compression and may include processing to correct the distortion. Such processing may adjust the image data before it is compressed or may modify the color of the compressed data before transmission. Current transmission methods only provide information about the specific way the data is processed to compensate for the distortion. Such a limited transmission method requires that the decompressor be designed to identify the compensation factors and implement the distortion correction on the image or compressed data. As a result, there is no data transmission method which provides a general system for providing information for conversions between most known color systems which incorporate the distortion correction data. What is needed is a fractal transform data transmission method which incorporates distortion compensation information along with color space conversion information.

What is needed is a fractal transform data transmission method which provides fractal transform information in a resolution independent manner with color space information so that a compressor and decompressor need not be designed to implement the compression and decompression processes for a particular application.

SUMMARY OF THE INVENTION

The above limitations have been overcome by a data transmission method operating in accordance with the principles of the present invention. An inventive data transmission method for transmitting the fractal transform data generated by a compressor to represent an original image comprises the steps of generating a header data segment having image reference information, color space information, fractal transform region reference data and generating a fractal transform data segment having a domain identifier, a range identifier, and fractal transform parameter information for each domain of said original image. A transmission method incorporating the steps of the present invention provides image information to identify the data being generated by a compressor implementing a fractal transform process regardless of application. The inventive method also provides image information so a decompressor may adapt the regeneration of the image to any output device and color space.

The image reference information provides a decompressor with physical size information about the original data set to facilitate regeneration of an image to dimensions other than those of the original data set. Preferably, this information includes the size units for the physical dimensions of the image, identification of the color space of the original data set, any conversion method used to convert the color space of the original image before compression, and the physical size of the fractal transform regions used to compress the data set.

The fractal transform region reference data preferably includes data about the size of the largest fractal transform elements or regions used by the compressor to process the original image so that a decompressor may effectively allocate memory resources for the decompression task. The compressor preferably divides the original image into panels and generates fractal transform data to represent the panels. The panels are sized so the decompressor does not need sufficient memory to decompress the entire image at one time. Thus, the data transmission method of the present invention most preferably provides the size of the largest panel processed so the decompressor may allocate a working buffer sufficient to process the largest image segment to be transmitted.

The fractal transform data segment includes domain and range identifiers which provide an origin for domains and ranges to be used by the decompressor to regenerate the original image. This information coupled with the information regarding the physical dimensions of the fractal transform elements may be used to generate larger domains and ranges in the decompression process which make the decompression process more efficient. As a result, ranges and domains may be individually selected for each panel in the compression process and this information may be provided to the decompressor without expressly incorporating these size parameters in the decompressor design. That is, the decompressor may be "told" by the compressor what domain and range sizes are to be used without specifically programming the decompressor with this information. The fractal transform data segment also includes the spatial matrix, scaling factor, translation factor, and gradient matrix for each domain when no optional header is included in the header data segment.

Preferably, the header data segment includes an optional header in which frequently used fractal transform parameters are placed. These frequently used fractal transform parameters are also called common fractal transform information as these parameters are correlated to more than one domain identified in the fractal transform data segment. The domains are correlated to the common fractal transform information by indices corresponding to a domain in the fractal transform data segment.

The common fractal transform information includes identification for the common spatial matrices used in the compressor and the intensity scaling factors used in the compressor. By identifying these common elements in the header of the fractal transform data file, the fractal transform data segment of the inventive method may be significantly reduced in size. Also, because the common matrices are not a predefined set but rather are the matrices generated by a compressor, the data transmission method of the present invention is flexible enough to identify generated compression parameters in a generalized format without requiring predefined parameters in a data message. As a result, a decompressor may be designed which supports a variety of compressors without having to incorporate the specific parameters of each compressor in its design. Preferably, the common fractal transform information also includes gradient matrices which may be used to individually modify elements for a regenerated domain. This gradient factor has been developed for fractal transform data compression methods to further improve the correspondence between a domain and range.

The indices for a domain identified in the fractal transform data segment correlate a domain and range identified by a domain and range identifier to one or more portions of the common fractal transform parameters in the optional header of the header data segment. In this way, the decompressor may retrieve the common fractal transform elements which define a mapping function between a domain and range. The common fractal transform elements may include a coefficient matrix, a scaling factor, and a gradient matrix. If a domain is represented by a mapping function which does not use a common fractal transform parameter then that parameter is stored in the fractal transform data segment with its corresponding domain identifier. In this way, the inventive method provides coefficient matrices, scaling factors, and gradient matrices not frequently used by the compressor, yet still maintains the structure to identify fractal transform parameters which are frequently used by the compressor in an efficient manner.

The above data transmission method provides a flexible and generalized way of providing fractal transform data for compressors and decompressors.

BRIEF DESCRIPTION OF THE DRAWINGS

The present invention may take form in various components and arrangement of components and in various steps and arrangement of steps. The drawings are only for purposes of illustrating a preferred embodiment and are not to be construed as limiting the invention.

DETAILED DESCRIPTION OF THE INVENTION

The fractal transform process may be described as the determination of mapping function parameters which may be iteratively applied to a random data buffer to generate an attractor which represents a data set or a portion of a data set. As set forth in a number of important writings, such as *Fractals Everywhere* by Michael Barnsley, the Collage Theorem states that these mapping parameters may be determined for portions of a data set and the union of the attractors generated by the mapping functions approximates the original data set.

Generally, these mapping function transformations are directed to two aspects of the data set—location or spatial information and intensity information. Spatial information identifies the location of the intensity information elements for a data set. For example, data sets may generally be expressed as n-dimensional arrays. For a simple Euclidean space, the array is two-dimensional such that each image element has a row and column identifier to identify the location or spatial component or parameter for the element. Additionally, each element has a data value which provides the intensity information for the data element. To transform the data so that a mapping function may represent it, the mapping function is usually comprised of a spatial affine transformation parameter and an intensity mapping parameter. The spatial affine transformation parameter corresponds to the location of the data element within a data set and the intensity mapping function corresponds to the intensity information content of the data element.

Mathematically, the original data set F may be expressed as a set of fractal transforms, $F_x$, $F_y$, and $F_v$. In short form, this may be expressed as:

$$F=(F_x,F_y,F_v)$$

A data set so represented may be segregated into domains having a width w and a height h such that the original data set is covered by n×m domains. The mathematical notation for these domains is:

$$D_{ij} = \left[\frac{i}{n}\ w, \frac{i+1}{n}\ w\right] \times \left[\frac{j}{m}\ h, \frac{j+1}{m}\ h\right] =$$

$$d_{ij} + \left[0, \frac{w}{n}\right] \times \left[0, \frac{h}{m}\right],$$

$$0 \leq i < n \text{ and } 0 \leq j < m.$$

The spatial affine transformation for a domain tile is the fractal transform set ($F_x$, $F_y$), which may be expressed as:

$$(F_x,F_y)D_{ij}:D_{ij}\rightarrow[0,w]\times[0,h]$$

or its equivalent:

$$d_{ij}+z|\rightarrow r_{ij}+\sigma_{ij}\cdot z,$$

where $d_{ij}$ is the origin for the domain block and z represents the w×h elements having $d_{ij}$ as its origin. The domain is mapped to a range block having its origin identified as $r_{ij}$ and the spatial form σ is a coefficient matrix which represents a shrinking of the range block to a size that conforms the range to a set of w×h data elements with an origin at $r_{ij}$. Thus, the mathematical statement represents a spatial mapping of the domain with origin at $d_{ij}$ to a shrunken range block with its origin at $r_{ij}$.

In a similar manner, the intensity data may be represented as: $F_\nu|_{D_{ij}}:D_{ij}\rightarrow\{(-\infty,\infty)\rightarrow(-\infty,\infty)\}$, which is a shorthand expression that the density vectors may be mapped in the range of $(-\infty,\infty)$. A fractal transform for the intensity data may be expressed as: $F_\nu(d_{ij}+z)(v)=q_{ij}+p_{ij}\cdot v+\tau_{ij}\cdot z$, where the mapped intensity values for the w×h data elements having an origin at $d_{ij}$ is equal to $q_{ij}$ an intensity translation factor, plus the product of an intensity scaling factor $p_{ij}$ and the intensity value v, plus the product of a gradient matrix $\tau_{ij}$ acting on the w×h elements of the domain. The q and p values are known in the fractal transform compression field. Preferably, the τ matrix is a 1×2 matrix and the values of the elements comprising the gradient matrix τ are used to modify each data element of the domain individually. In this way, shading or the like may be applied to a domain to better map the domain to a range. The coefficients of the gradient matrix may be computed using analytical methods or they may be selected a priori based on empirical data. A compressor adjusts the value of $q_{ij}$, $P_{ij}$, and $\tau_{ij}$ to improve the correspondence of a domain to a range. Thus, the present inventive data transmission method uses the parameters $\{d_{ij},r_{ij},q_{ij},p_{ij},\tau_{ij},v_{ij}\}$ to describe the mapping of the spatial and intensity information for any fractal image.

Figure 1A:
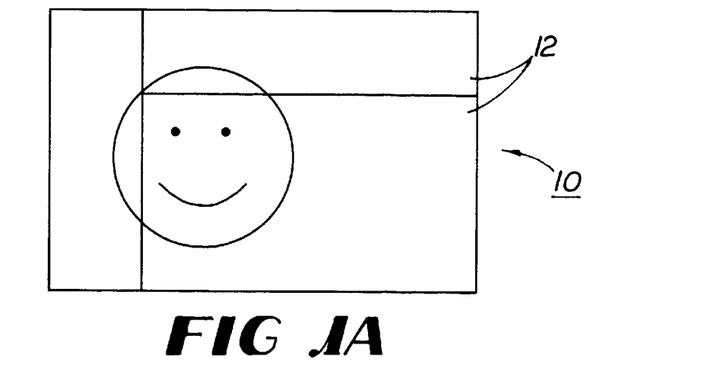
FIG. 1A is an illustration of an image divided into panels for compression.
Figure 1B:
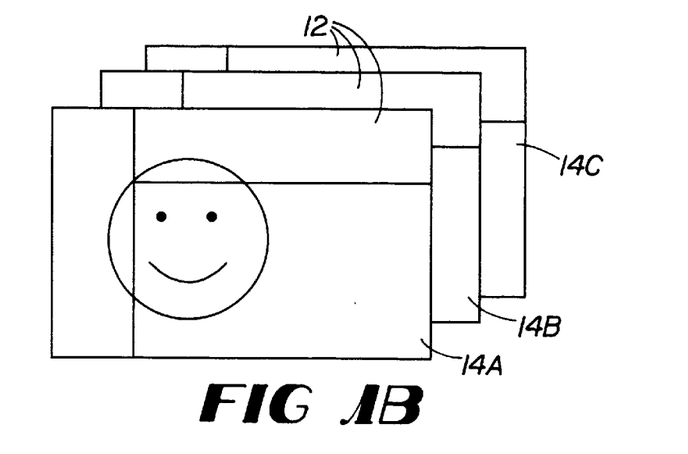
FIG. 1B is an illustration of the screens for a color space comprising the panels of the image shown in FIG. 1A.

An example of a data set to be represented by fractal transform parameters is shown in FIG. 1A. That Fig. shows an image 10 comprised of pixel elements of a typical size such as 1024×768 pixels. The lines shown on the surface of FIG. 1A represent panels 12 into which the image 10 is preferably divided. The panels 12 are preferably sized to correspond to typical memory partition sizes used in conventional decompressors. Panels 12 must cover image 10 without overlapping so the processing of the compressed data for all of the panels 12 regenerate image 10. FIG. 1B shows a similar representation of pixel data for a color density image such that there are three screens 14a, 14b, 14c for each panel 12. Each of the screens 14a, 14b, 14c correspond to one component of the color space. As known in fractal transform processes, the panel data may be further divided into domains and ranges so that all of the domains may be expressed by a mapping function which best maps a domain to one of the ranges. The determination of these mapping functions requires the identification of the parameters $\{d_{ij},r_{ij},q_{ij},p_{ij},\tau_{ij},v_{ij}\}$ which are determined according to known methods. Even though the inclusion of τ to define a mapping function is novel, the methods for calculating the coefficients for the matrix are the same as those for calculating the coefficients of the spatial matrix ν.

Figure 2:
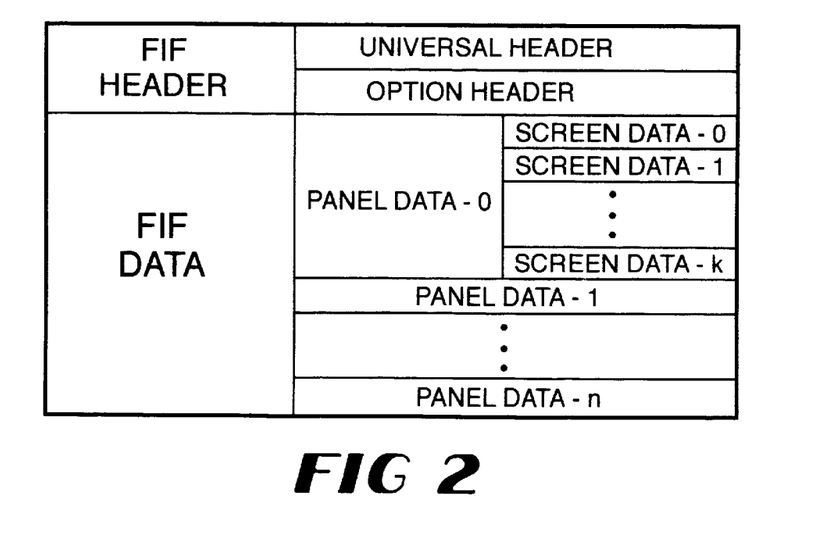
FIG. 2 is a diagram of the format of a file generated by the preferred method of the present invention.

The structure of the data transmission produced by the fractal transform data transmission method of the present invention is shown in FIG. 2. The preferred scheme includes a header segment 20 and a fractal transform data segment 22. The header segment 20 includes a universal header 24 and may include an optional header 26 which is used to identify common fractal data parameters. The fractal transform data segment 22 generated by the data transmission method of the present invention is preferably divided into contiguous areas that define fractal transform parameters for each panel 12. Within the information for each panel 12, the fractal transform parameters are defined for each screen 14 which comprises a panel. In this manner, a decompressor may identify and regenerate all of the screens 14 associated with the panels 12 of the original image 10 and regenerate a representation of those screens 14. The screens 14 may then be used to generate a representation of the panels 12 and image 10 at the receiving site.

Figure 3:
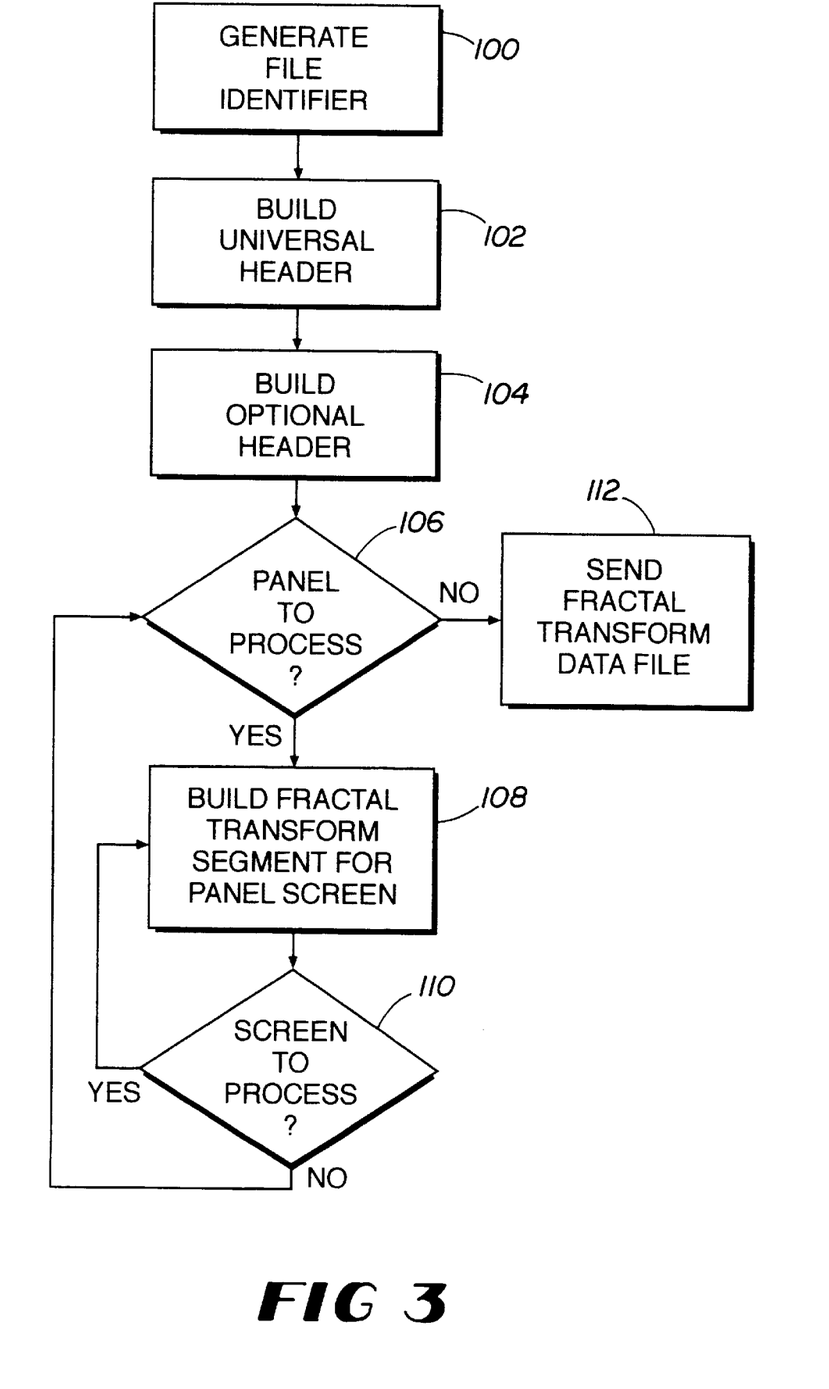
FIG. 3 is a flowchart of the high level processing performed by the preferred method in building a file of fractal transform data.

The data transmission method of the present invention is shown in FIG. 3. In brief, the process constructs a file of fractal transform data which represents an image and sends the file to a decompressor which regenerates the image. The process begins by inserting a file identifier which identifies the data file as containing fractal transform image data (Step 100). By so identifying the file, the compressor may be included in a system where files are not all of the same type. This element may be omitted from a file if the data transmission stream only consists of fractal transform image data files. The process continues by building a universal header for a header segment which includes image reference data, color space data, fractal transform region reference data and file decoding data (Step 102). If the compressor frequently used one or more particular spatial matrices, scaling factors, or gradient matrices to represent data in a panel, then data for an optional header is added to the header segment (Step 104). If there are no such frequently used parameters, the optional header is not added to the file and the process continues by determining whether fractal transform parameters are available for a panel (Step 106). If there is panel data, the fractal transform parameters for the first screen are transferred to the file (Step 108) and the process determines whether there are more screens to process for the current panel (Step 110). If there are, the fractal transform parameters are written to the file. When no more screens for a panel need processing, the process continues building the file if other panels exist for the image. Otherwise, the file is closed for transmission to a decompressor (Step 112).

Figure 4:
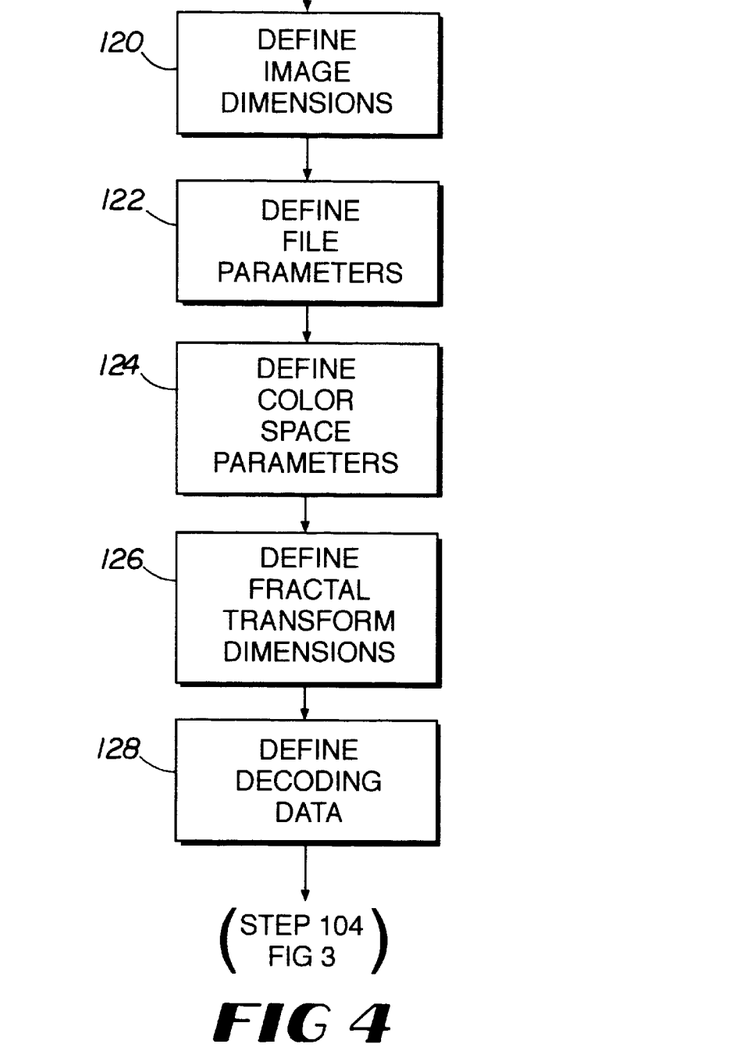
FIG. 4 is a flowchart of the preferred process for building an universal header for a file of fractal transform data.

The steps for building an universal header are shown in more detail in FIG. 4. The following detailed discussion of the processing to build the universal header should be read in view of the preferred universal header structure shown in FIGS. 6A & 6B. The physical dimensions of the input image are stored in the header (Step 120) to facilitate computations for size differences in the display device at the receiver. Preferably, these dimensions are expressed in units which are continuous such as an inch or meter. Thus, new dimensions for the image at the receiver site may be expressed in real numbers as opposed to integers for a pixel oriented system. Such dimensions render the fractal transform data transmitted by the present invention resolution independent. File parameters which define the size of the header and overall file size are preferably provided to facilitate decompressor processing of the fractal transform data file (Step 122). To provide the decompressor with information about the color space of the image, the process includes an identification of the color space of the original image and any color space conversions made by the compressor (Step 124). This identification is important so the decompressor knows the order of the screen data for the panels. To further support the resolution independence of the fractal transform data, the process defines the dimensions of the fractal transform regions such as the domains, ranges, and panels (Step 126). Finally, decoding elements such as the number of tags in the optional header, an image identifier, and recommended decompression filters are included in the universal header of header segment 22 (Step 128).

The information regarding the physical dimensions of an image (Step 120) are provided in physical size units. The size unit may be further defined by indicating a scaling factor for the physical size unit. Preferably, the scaling factor is an exponent of the base 10. For example, the size unit may be indicated by the character "m" which represents that a meter is the physical size unit. The scaling factor may be represented by a binary number between FFH and 7FH which correspond to the range of −128 to 127. A scaling factor of +3 (03H), to continue the example, would indicate a measurement in kilometers (103 meters) and a value of −3 (FDH) would indicate a measurement in millimeters ($10^{-3}$ meters). The width and height of the image prior to compression may be expressed in the physical size units so defined. This information is used by a decompressor to adjust data being regenerated at the decompressor when the decompressed image size is different from that of the image size as compressed. For example, if a small image is being expanded to fill a monitor, the decompressor may adjust the position of regenerated data elements so that the domains of the compressed image correspond to the correct areas in the decompressed image.

The definition of the color space performed by the preferred method identifies the color space for the original image and the compressed image. For the original image, these identifiers preferably correspond to a grayscale, a classic YUV color space, an equalized YUV color space, a GRB color space, and KCMY color space. The YUV color space is derived from a GRB color space using known conversion factors. The GRB color space is typically converted to YUV because YUV color spaces are most frequently used with optically generated data such as monitor screen images. The KCMY color space is frequently used for images formed by printing processes and grayscale values are used to generate black and white or shaded black and white images. The identifiers for each of these color spaces preferably indicate the order of the components in the data space. This is of particular importance since the contribution of each of the components is different and the decompressor must be able to identify the informational content of a decompressed screen for regeneration of an image. For example, the luminance (Y) screen of the YUV color space provides most of the detail while the chrominance components (UV) appear relatively flat to the human eye. If the data for these screen elements were misidentified, the resulting image would not accurately represent the original image. The preferred color space identifiers for the compressed image data are grayscale, RGB, BGR, GRB, and KCMY as these are the more common color systems used to display images. Thus, the color definitions supported by the method of the present invention permit the color space of the original image and compressed image to be identified across a wide range of applications.

As stated above, the preferred method also incorporates information regarding the physical dimensions of the fractal transform regions in the universal header. For example, the physical dimension of the domains and ranges used by the compressor are expressed in the physical size units defined for the overall image. This fractal transform region reference data is comprised of the physical size of the smallest domain, also called a base domain or tile, used by the compressor, the number of base domains in a row on the original image, the number of base domains in a column on the original image, and the step size for the range blocks for the component screens of the identified color space. Preferably, the method identifies a step size for the first screen of the color space and a second step size for the ranges of the other color component screens. Step size refers to the movement of a range block from a first position to a second position to form a set of data elements which comprise the orientation blocks or shrunken range blocks used for matching ranges to domains. Small step sizes means more processing must be done to evaluate all of the potential matches for a screen, but more accurate matches may be determined as a result. Thus, for the color spaces identified for the compressed image, there is normally more detail for the first or primary screen of a color space and thus a smaller step size for the ranges of that screen. The additional processing needed to determine the best correspondence between a domain and range is performed on the primary screen to obtain the necessary detail. However, for the subsequent screens of a color space, a larger step size for the ranges may be used to reduce processing time and still accurately represent the data within that screen. Thus, the method of the present invention may be used to build a fractal transform data file which provides flexible range processing to accommodate the detail differences of the color components of a color space.

Figure 5:
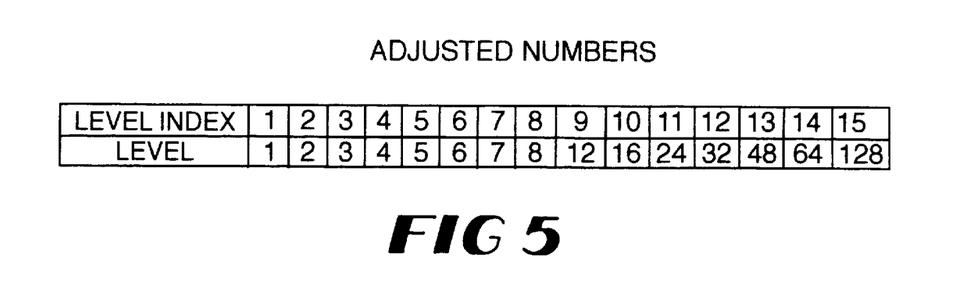
FIG. 5 is a diagram of a domain level marker for an universal header for a file of fractal transform data.

As stated in more detail below, each domain contained in the fractal transformed data segment may include an identifier that indicates the size of the domain in terms of the base domain identified in the header segment. Thus, the size of each domain represented in the fractal transform data segment generated by the data transmission method of the present invention may vary. To facilitate processing within the decompressor, the fractal transform region reference data in the universal header generated by the method of the present invention preferably includes information identifying the sizes of the domains used by the compressor for primary and secondary screens. In this way, the decompressor may eliminate domain sizes for processing which were not used by the compressor and correspondingly determine memory requirements for decompressing a screen. Preferably, the levels for the domain sizes used by a compressor are represented by setting bits in a dataword. Two datawords are preferably provided so that one dataword represents the domain levels for the first screen of the identified color space for the panels and a second dataword represents the domain levels for the remaining or secondary screens of that color space since the first screen usually contains more detail and hence requires more memory than the subsequent screens for a panel. The preferred layout of the domain level marker dataword is shown in FIG. 5. For example, a bit having a logic "1" value in the level 2 position indicates a domain 2 base domains by 2 base domains in size was compressed for a screen while a logic 1 bit in the level 12 position indicates a domain 32 base domains by 32 base domains in size was compressed. The zero bit position of the dataword is preferably undefined although it may be used to define another domain level. Thus, the decompressor may determine what size domains were mapped by the compressor for the screens of a panel by determining which bits of the domain level marker are set.

The preferred method for building the universal header also includes the maximum number of base domains in a row for a panel and in a column for a panel. As decompressors process the compressed data on a panel by panel basis, this information permits a decompressor to allocate sufficient working memory to decompress the panel. This largest working memory allocation necessary to process a panel permits a decompressor to define a working memory buffer for the decompression process. Likewise, the preferred method also identifies a maximum data size for the fractal transform parameters for a particular panel so the decompressor may allocate sufficient memory space to retrieve all of the fractal parameters associated with a panel. Thus, the method of the present invention permits a decompressor to determine whether it has sufficient working memory and input memory to process a fractal transform data file before it begins processing that file.

The decoding parameters defined in the universal header include identification of the number of tags defined in the optional header and an identifier for the image. Additionally, a decompression filter must be identified because fractal transform methods regenerate images in a resolution independent manner since pixels in the original image are mapped to a physical location. When the physical location is not on a pixel in the decompressed image space, the decompressor must interpolate a pixel value based on some filtering of neighboring pixels. For example, if the dimensions of the output display expand an area for display, a decompression filter indicates how pixel information may be generated for the expanded area. For an averaging filter, the decompressor may take the four closest pixel elements to an unmapped pixel, average them and place that pixel value in the regenerated area. Other filters are possible and may be identified in the header. Preferably, the decompression filter identifier identifies the decompression filter that best corresponds to the compression method used to compress the image data, although other commonly used filters may be used by the decompressor. In an alternative embodiment of the present invention, the fractal transform data segment is compressed using a lossless compression scheme to further reduce the amount of data to be transmitted. For such an embodiment, the lossless compression method is identified so the decompressor may decode the fractal transform segment.

Figure 6A:
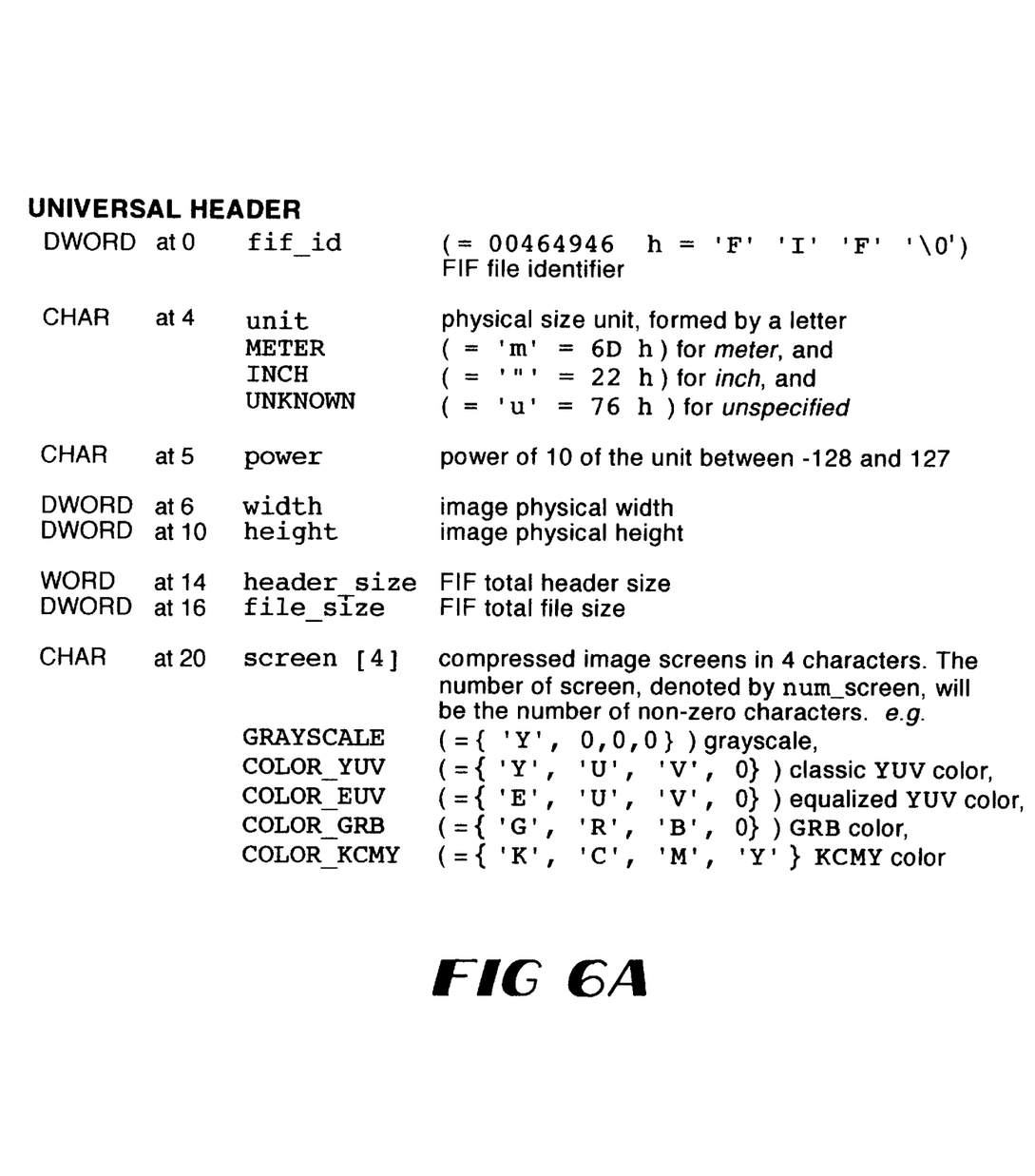
FIGS. 6A and 6B, and 6C are a diagram of the universal header data fields as structured by the preferred method of the present invention shown in FIG. 4.
Figure 6B:
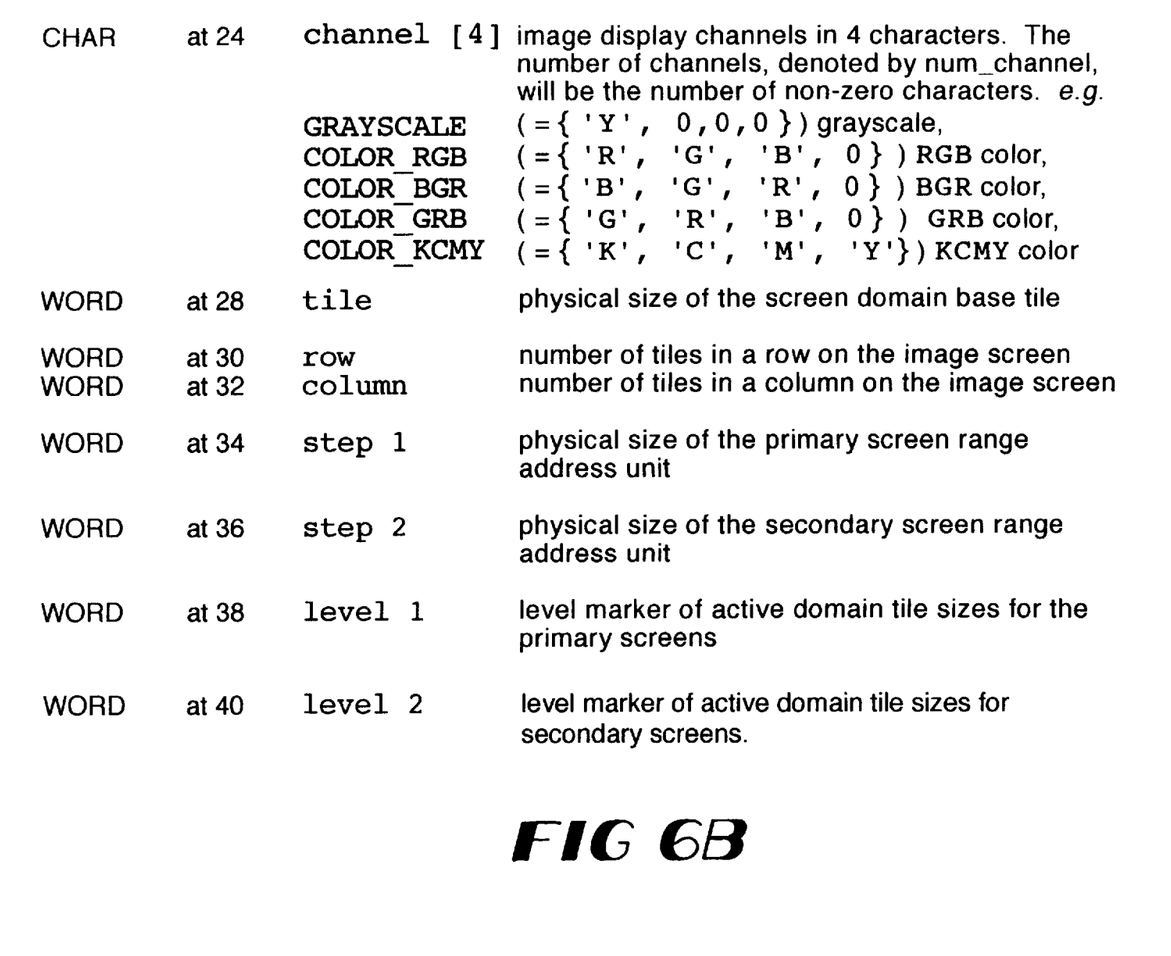
Figure 6C:
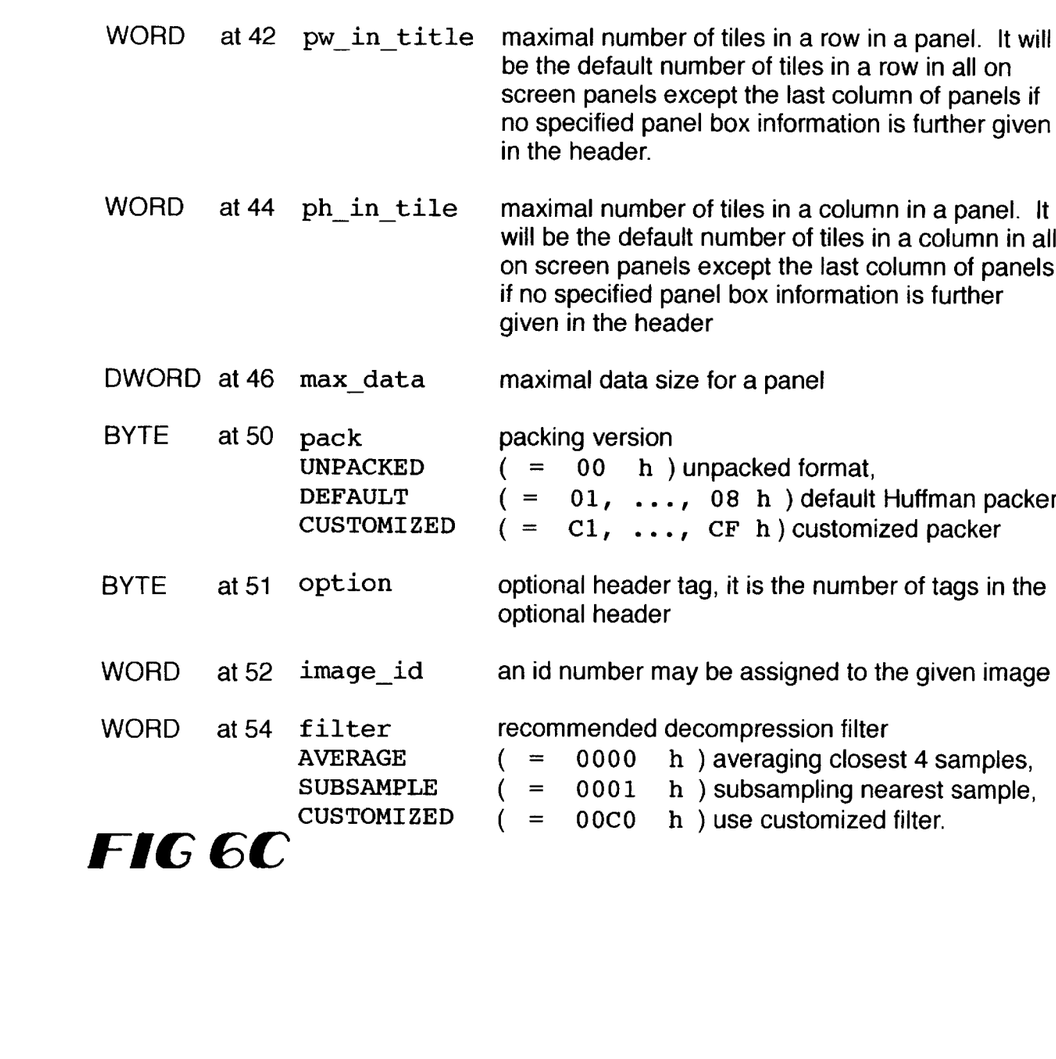

The universal header constructed by the preferred method of the present invention is shown in FIGS. 6A & 6B. That header includes data fields for the information discussed in more detail above. In reviewing the preferred structures shown in FIGS. 6A, 6B, 8A, 8B, and 9, the terms CHAR, SHORT, and LONG mean signed 8-bit, 16-bit, and 32-bit data value. BYTE is an unsigned CHAR data value, WORD is an unsigned SHORT data value, and DWORD is an unsigned LONG data value Preferably, the byte order is least significant byte first and bits within a byte are ordered from least significant to highest.

Figure 7:
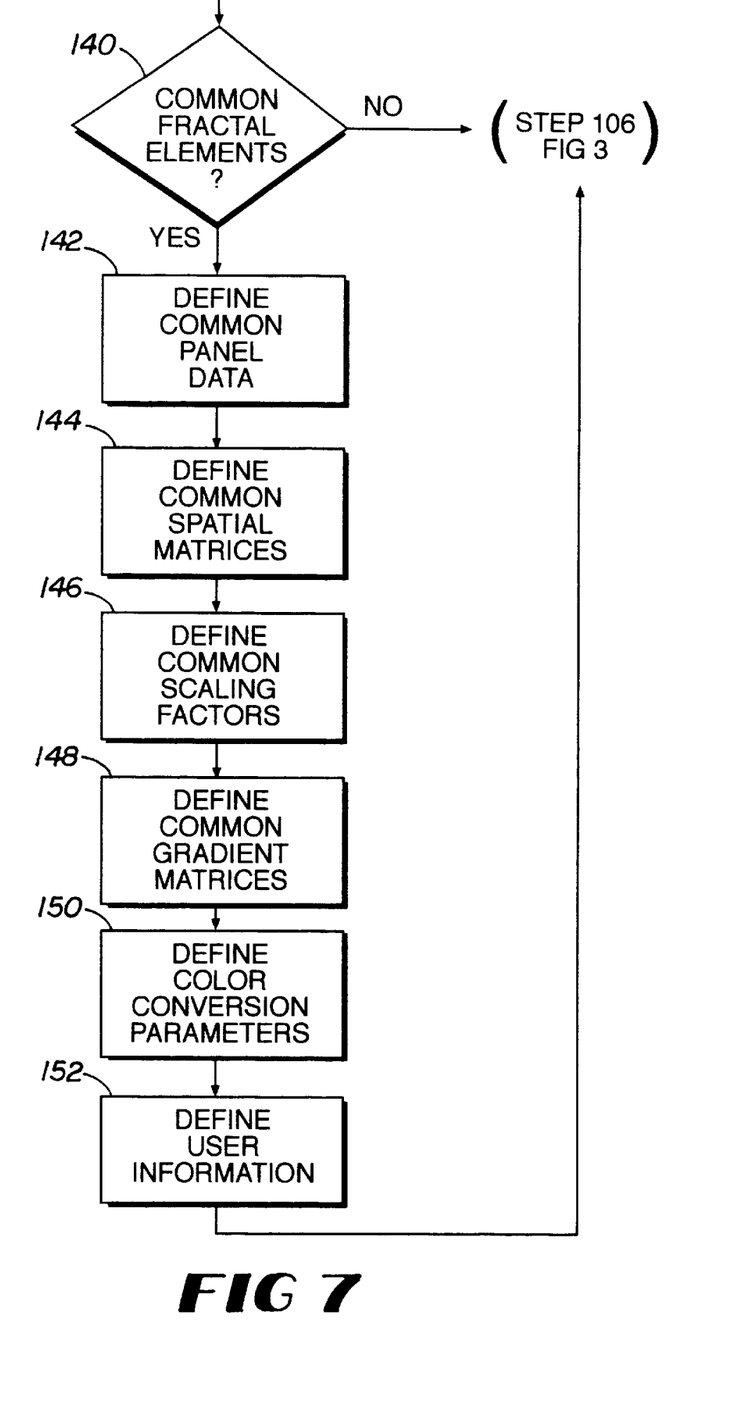
FIG. 7 is a flowchart of the preferred method for building an optional header for a file of fractal transform data.
Figure 8A:
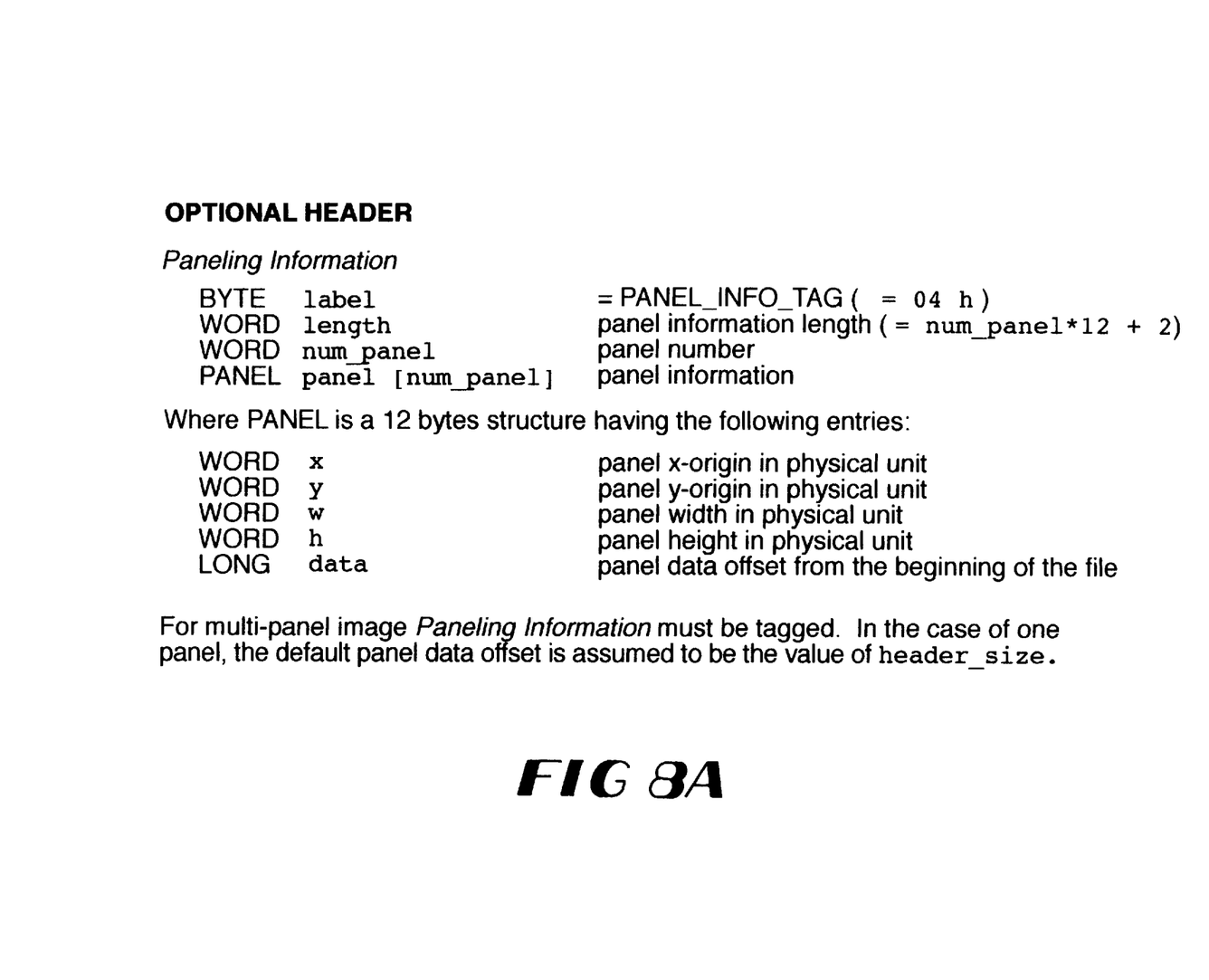
FIGS. 8A, 8B, and 8C are a diagram of an optional header as built by the preferred method of the present invention shown in FIG. 7.
Figure 8B:
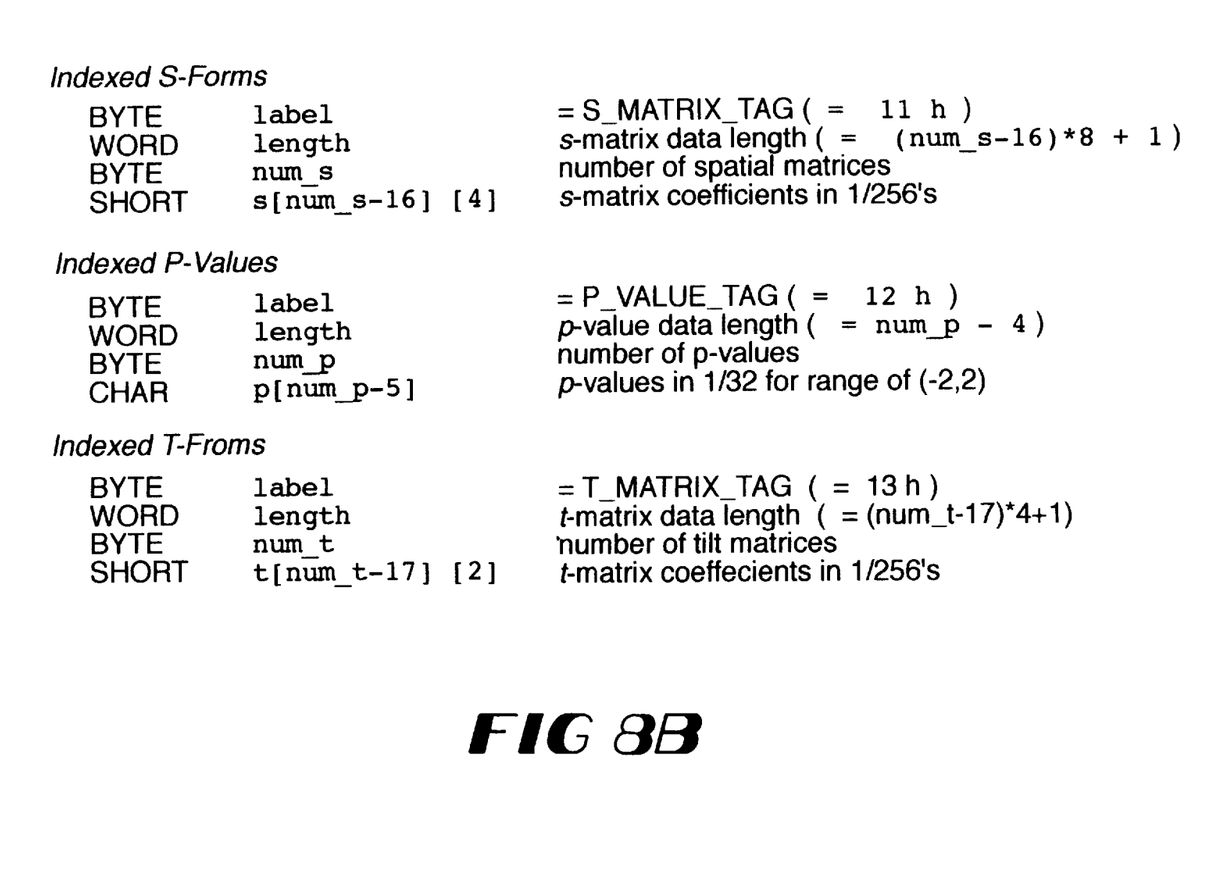
Figure 8C:
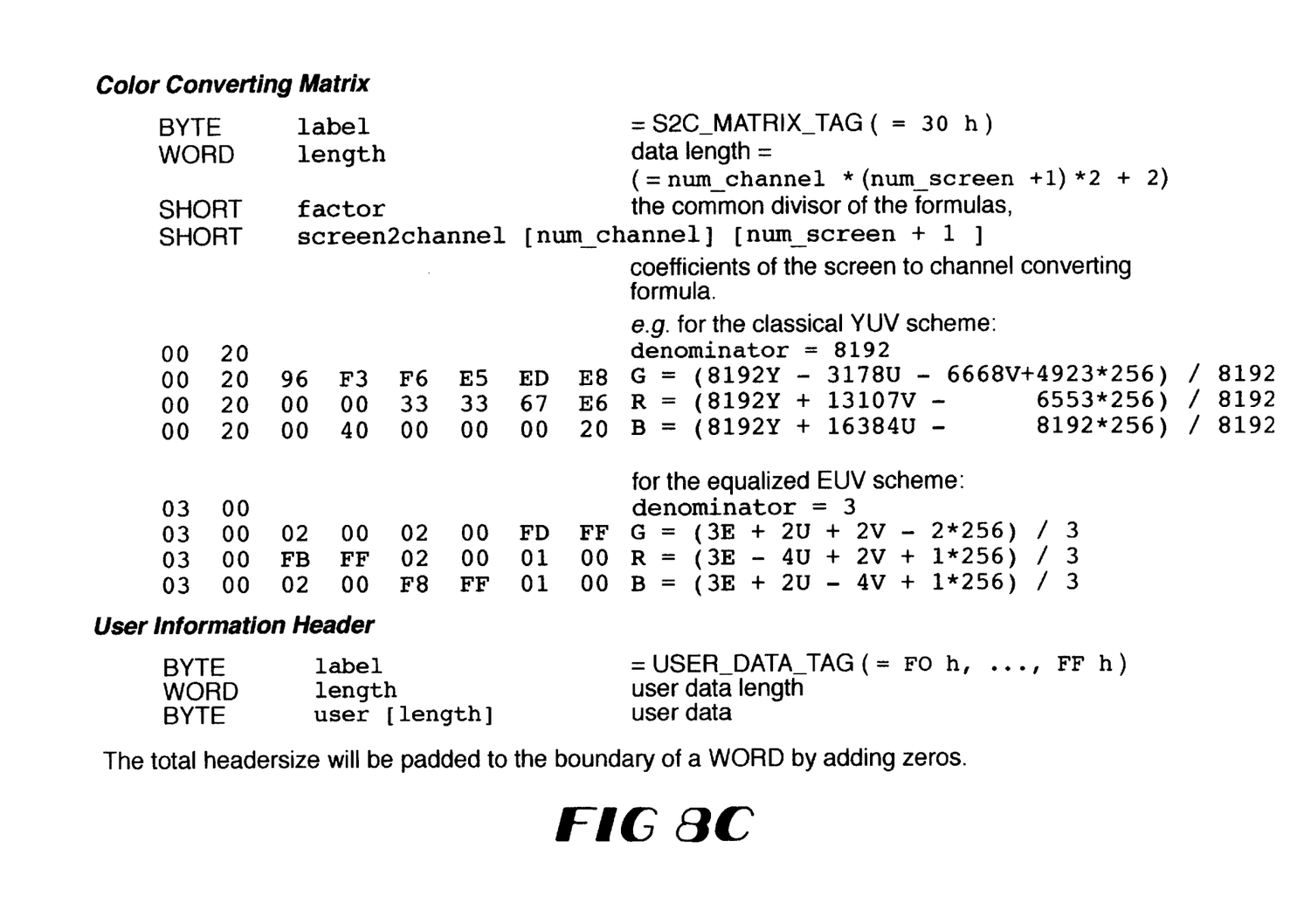

The preferred method of the present invention for building the optional header of header segment 22 is shown in FIG. 7. The process continues by determining whether common fractal transform parameters exist (Step 140). It then defines the common panel parameters (Step 142), common spatial matrices (Step 144), common scaling factors (Step 146), and common gradient matrices (Step 148). A color space conversion scheme (Step 150) and user information (Step 152) may also be included. The steps of the process are discussed in more detail below. The common fractal transform parameters are spatial matrices, scaling factors, and gradient matrices which are used by a compressor to map more than one domain to a range. These common parameters may be selected based on the number of domains with which they are used or a predetermined number of parameters may be selected after they are ranked according to the number of domains with which they are used. To accompany the description of the process provided below, FIGS. 8A and 8B shows an optional header which is generated by the preferred method of the present invention.

Once common parameters have been identified, the process defines all of the fractal transform parameters which comprise the common panel data and writes the information to the file (Step 142). Panel data preferably includes an identifier for each panel, the coordinates for the origin of each common panel expressed in the physical size units discussed above, and the width and height of the panel also expressed in the physical size units. Preferably, the information also includes the offset from the start of the file to the panel information so that the decompressor may more quickly retrieve the panel data rather than computing the offset itself.

After the common panels are defined and written to the fractal transform data file, the coefficients for the common spatial matrices are identified (Step 144). Preferably, each spatial matrix is identified by a tag, the length of the data to define the spatial matrix, the number of matrices defined in the header, and the coefficients for each common spatial matrix. Preferably, the data length is the number of matrices multiplied by the storage allocation required for each coefficient in the matrix plus one storage location for the number of matrices defined. Preferably, the matrices are for affine mapping functions and contain four (4) coefficients, although other matrix forms and mapping functions such a polynomial function may be used. To better represent real number coefficients, the coefficients are multiplied by 256 before being stored in the header.

In a similar manner, the intensity scaling factors are defined for the optional header by the preferred method of the present invention (Step 146). The method identifies the number of such factors for the header and the length of the data required to represent these factors. The factors are preferably multiplied by 32 before being stored in the header. The scaling factors generated by a compressor must constrain the function so it converges to an attractor. Typically, this is done by requiring that all of the scaling factors be less than 1. However, some compressors generate scaling factors greater than one as long as most of the scaling factors are less than 1 so the overall function converges. Preferably, the method of the present invention stores scaling factors in the range of −2 to +2.

The method of the present invention also defines the common gradient matrices which may be used to modify the individual data elements in a domain to further enhance the correspondence between a domain and range (Step 148). The identifiers for these gradient matrices include the total amount of data used to represent all of the gradient matrices, the number of gradient matrices in the header and the coefficients of the gradient matrices. The matrices preferably represented by the method of the present invention are matrices having two coefficients. Again, to better represent real numbers, the coefficients are multiplied by 256 before being stored in the optional header.

As explained above, the original image may have been converted from one color space to a second color space before compression. If such a conversion is identified in the universal header, the data for performing this conversion from one color space to the other may be included in the optional header, although if the conversion method is a standard conversion method it may be omitted. If the color conversion method is specified in the optional header, it includes the coefficients for converting the data elements of one color space to the second color space. In this manner, the compressor may clearly identify the method for converting the color from one space to another and, if any compensation for compressor distortion of color space was incorporated in the coefficients for the conversion scheme, the distortion correction data is provided as well.

The preferred method of the present invention also permits a user to provide information which may be a caption or the like for the regenerated data. However, if a user wanted to provided application specific information for use by a decompressor, that information may be provided in this field as well. Such user supplied information is not necessary for the representation of the fractal transform data transmitted by the method of the present invention.

Figure 9:
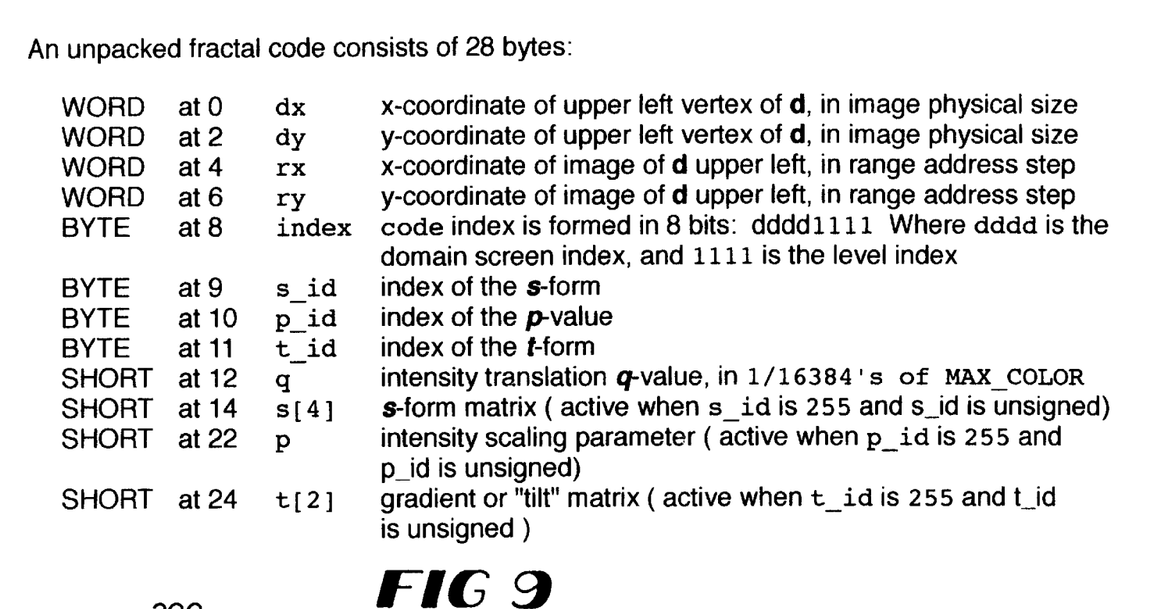
FIG. 9 is a diagram of a data structure for fractal transform data for a domain in the fractal transform data segment of a file of fractal transform data.

As shown above in FIG. 2, the fractal data segment 26 is organized by panels. Thus, the method of the present invention includes the fractal transform data following the header for the first panel and the data for each screen comprising the panel are included in order before the fractal transform information for the second panel is stored in the file. The fractal transform data for the domains of the screens comprising the panels stored in the file by the method of the present invention are shown in FIG. 9. For each screen, every domain of the screen is identified with the following information: the identification of the origin of the domain (dx, dy), which is preferably the upper left vertex of the domain, the origin of the range (rx, ry), which is preferably the upper left vertex of the range, an index identifier (ddddllll) which indicates the screen (dddd) in which the domain is a member and a level code (llll) identifying the domain level which indicates whether the domain is the base domain size or a multiple thereof, a common spatial matrix index (s_id), an intensity scaling factor index (p_id), a gradient matrix index (t_id), followed by a list of fractal transform parameters for the domain (q,s[4],p,t[2]), if necessary. The indices for the spatial matrix, intensity scaling factor, and gradient matrix correspond to an offset from the first address in the header which points to the first member of the spatial or gradient matrix or the scaling factor in the optional header. Thus, these indices correlate certain common spatial matrix coefficients, scaling factors, or gradient matrix coefficients in the optional header to a domain in the fractal data transform segment. Accordingly, the present invention provides a buffer of fractal transform parameters and a way of indexing into those parameters for each domain of a screen. If any of the index values are negative, the decompressor selects the corresponding fractal transform parameters (q,s[4],p,t[2]) included in the fractal transform data segment for the domain. Likewise, the fractal transform parameters in the fractal transform data segment include a translation factor q which is preferably multiplied by 16,384 and divided by the greatest possible value for the intensity value in the color space before storage. Translation factors are not included in the optional header because translation parameters are not usually used by more than one domain. Thus, these parameters are not included as a common parameter in the header, although they may be.

By implementing the method of the present invention in a compressor, the compressor can organize the fractal transform parameters in a fashion which may be decompressed by any decompressor capable of performing fractal transform decompression. Each domain and range for each screen of each panel is defined in an efficient form which takes advantage of common fractal transform parameters, yet still permits identification of fractal transform parameters specific to a domain. The method provides information regarding the physical dimensions of the original image so the decompressor may compensate for expansion or contraction of that image prior to its display. The present method also expresses the domains as base domains or multiples thereof to facilitate the regeneration of the domains in the decompressor. In a similar manner, the method of the present invention includes information regarding the color components of the original image, any conversion of that image for purposes of compression, or correction factors incorporated in the color conversion method for compensating for compressor distortion of the color space. Thus, the present invention provides a method and data format for transmitting fractal transform data which is flexible enough to be adapted to a wide variety of applications, provide images with independent image resolution, and efficiently provide fractal transform parameters to a decompressor.

Figure 10:
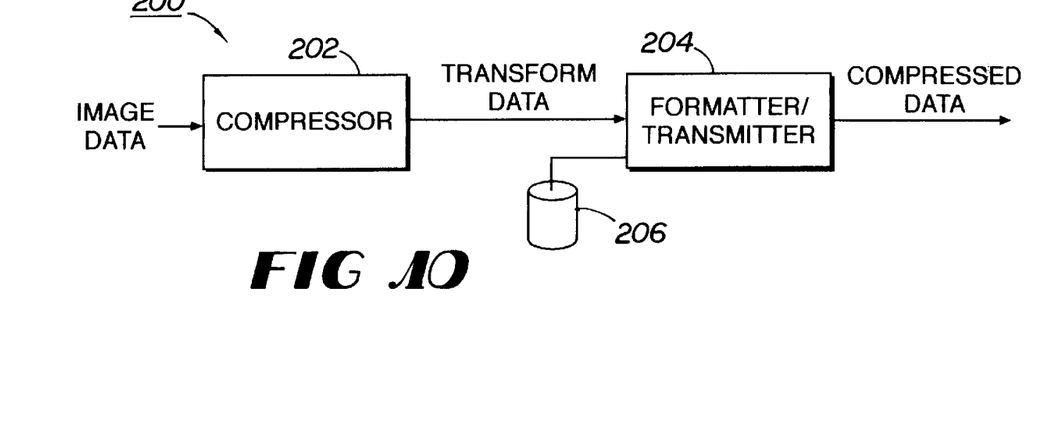
FIG. 10 is a block diagram of a system having a formatter/transmitter that implements the preferred method of the present invention.

A system for implementing the method of the present invention is shown in FIG. 10. That system 200 includes a compressor 202 and a formatter/transmitter 204. Compressor 202 receives image data, divides it into panels, compresses the screens for each panel and outputs the fractal transform parameters, fractal transform region reference data, image reference data, color space data, domain identifiers and range identifiers to formatter/transmitter 204. Formatter/transmitter 204 generates a file of fractal transform data with this data constructed in accordance with the principles of the present invention. Preferably, formatter/transmitter 204 applies a lossless method such as Huffman encoding, Q-coding, or other arithmetic encoder to further compress the fractal transform data segment prior to transmission. After the fractal transform data file is closed it may be stored in memory 206 or transmitted to a remote site for decompression.

Compressor 202 and formatter/transmitter 204 may be implemented on the same computer system or separate systems. To implement the method of the present invention, a system having an Intel 80486 processor running at 66 MHz with 8 Megabytes of RAM and 500 Megabytes of hard drive space has been programmed. Any such system or its equivalent may be used. The program may be written in C, C++, or any equivalent or similar language.

While the present invention has been illustrated by the description of a preferred and alternative embodiments and processes, and while the preferred and alternative embodiments and processes have been described in considerable detail, it is not the intention of the applicant to restrict or in any way limit the scope of the appended claims to such detail. Additional advantages and modifications will readily appear to those skilled in the art. The invention in its broadest aspects is therefore not limited to the specific details, preferred embodiment, and illustrative examples shown and described. Accordingly, departures may be made from such details without departing from the spirit or scope of applicant's general inventive concept.

What is claimed is:

1. A method for transmitting fractal transform data generated by a compressor to represent an original image comprising the steps of:

generating a header data segment having image reference data, color space data, fractal transform region reference data, and file decoding data; and generating a fractal transform data segment having a domain identifier, a range identifier, and fractal transform parameter information for each domain of said original image.

2. The method of claim 1 further comprising the steps of:

generating an optional header having spatial matrix coefficients and scaling factors frequently used by said compressor; and generating indices for said fractal transform data segment correlating one of said domains to at least one of said spatial matrix coefficients and said scaling factors in said optional header.

3. The method of claim 2, wherein said image reference data includes dimension data in physical size units so that an image represented by said fractal transform data may be regenerated independently of a resolution of said original image.

4. The method of claim 2, wherein said fractal transform region reference data includes dimension data in physical size units for said domains and ranges identified in said fractal transform data segment.

5. The method of claim 2, wherein said decoding data includes identification of a decompression filter.

6. The method of claim 2, wherein said decoding data includes identification of a lossless compression method used to compress said fractal transform data segment.

7. The method of claim 2, wherein said fractal transform parameter information for a domain in said fractal transform data segment includes spatial matrix coefficients, a scaling factor, gradient matrix coefficients, and a translation factor for at least one of said domains.

8. The method of claim 2, wherein said color space data identifies said original image as being one of grayscale, classic YUV color, equalized YUV color, GRB color, and a KCMY color space.

9. The method of claim 8, wherein said step of generating said header further comprises the step of:

including color space data identifying a second color space into which said original image is compressed, said second color space data being identified as one of a grayscale, RGB, BGR, GRB, and KCMY color space.

10. The method of claim 2, said generating said optional header step further includes the step of:

generating gradient matrix coefficients in said optional header, said gradient matrix coefficients for modifying individual data elements in one of said domains identified in said fractal transform data segment.

11. The method of claim 10, wherein said indices for a domain identified in said fractal transform data segment include at least one of a spatial index, a scaling factor index, and a gradient index so that said domain corresponding to said spatial index, scaling factor index, and said gradient index correlate said domain to spatial coefficients, scaling factor, and gradient coefficients in said optional header.

* * * * *